(12) United States Patent
Oberlechner

(10) Patent No.: US 9,169,603 B2
(45) Date of Patent: Oct. 27, 2015

(54) MACHINE FOR MAINTENANCE OF A TRACK

(71) Applicant: FRANZ PLASSER BAHNBAUMASCHINEN-INDUSTRIEGESELLSCHAFT MBH, Vienna (AT)

(72) Inventor: Guenther Oberlechner, Virginia Beach, VA (US)

(73) Assignee: Franz Plasser Bahnbaumaschinen-Industrie-Gesellschaft mbH, Vienna (AT)

( * ) Notice: Subject to any disclaimer, the term of this patent is extended or adjusted under 35 U.S.C. 154(b) by 0 days.

(21) Appl. No.: 14/380,601

(22) PCT Filed: Mar. 15, 2013

(86) PCT No.: PCT/EP2013/000790
§ 371 (c)(1),
(2) Date: Aug. 22, 2014

(87) PCT Pub. No.: WO2013/152827
PCT Pub. Date: Oct. 17, 2013

(65) Prior Publication Data
US 2015/0025715 A1  Jan. 22, 2015

(30) Foreign Application Priority Data
Apr. 11, 2012 (AT) .................. A 426/2012

(51) Int. Cl.
*E01B 27/08* (2006.01)
*E01B 29/04* (2006.01)
*G01S 19/00* (2010.01)
*E01B 1/00* (2006.01)
*E01B 35/00* (2006.01)
*E01B 27/10* (2006.01)

(52) U.S. Cl.
CPC ................. *E01B 27/08* (2013.01); *E01B 1/001* (2013.01); *E01B 27/10* (2013.01); *E01B 29/04* (2013.01); *E01B 35/00* (2013.01); *G01S 19/00* (2013.01)

(58) Field of Classification Search
CPC ......... E01B 27/08; E01B 1/001; E01B 29/04; E01B 27/10; E01B 35/00; G01S 19/00
USPC .......................................................... 701/19
See application file for complete search history.

(56) References Cited

U.S. PATENT DOCUMENTS

| | | |
|---|---|---|
| 4,432,284 A | 2/1984 | Theurer et al. |
| 7,181,851 B2 | 2/2007 | Theurer et al. |
| 7,469,479 B2 | 12/2008 | Jager |

FOREIGN PATENT DOCUMENTS

| | | |
|---|---|---|
| DE | 3121836 A1 | 3/1982 |
| EP | 0722013 A1 | 7/1996 |
| GB | 2268021 A | 12/1993 |
| GB | 2268529 A | 1/1994 |
| WO | 2005103385 A1 | 11/2005 |

*Primary Examiner* — Mary Cheung
*Assistant Examiner* — Anne Mazzara
(74) *Attorney, Agent, or Firm* — Laurence A. Greenberg; Werner H. Stemer; Ralph E. Locher

(57) ABSTRACT

A machine for cleaning a ballast bed has, in front of a take-up device relative to a working direction, a first signal receiver—suitable for position determination in a global navigational satellite system—for scanning an actual track position. A second signal receiver connected to the machine for scanning a new track position created by laying down the raised track onto the re-applied ballast bed is arranged downstream. Both signal receivers are associated with a control device designed to act on the drives that displace a track-lifting device relative to the machine frame.

8 Claims, 1 Drawing Sheet

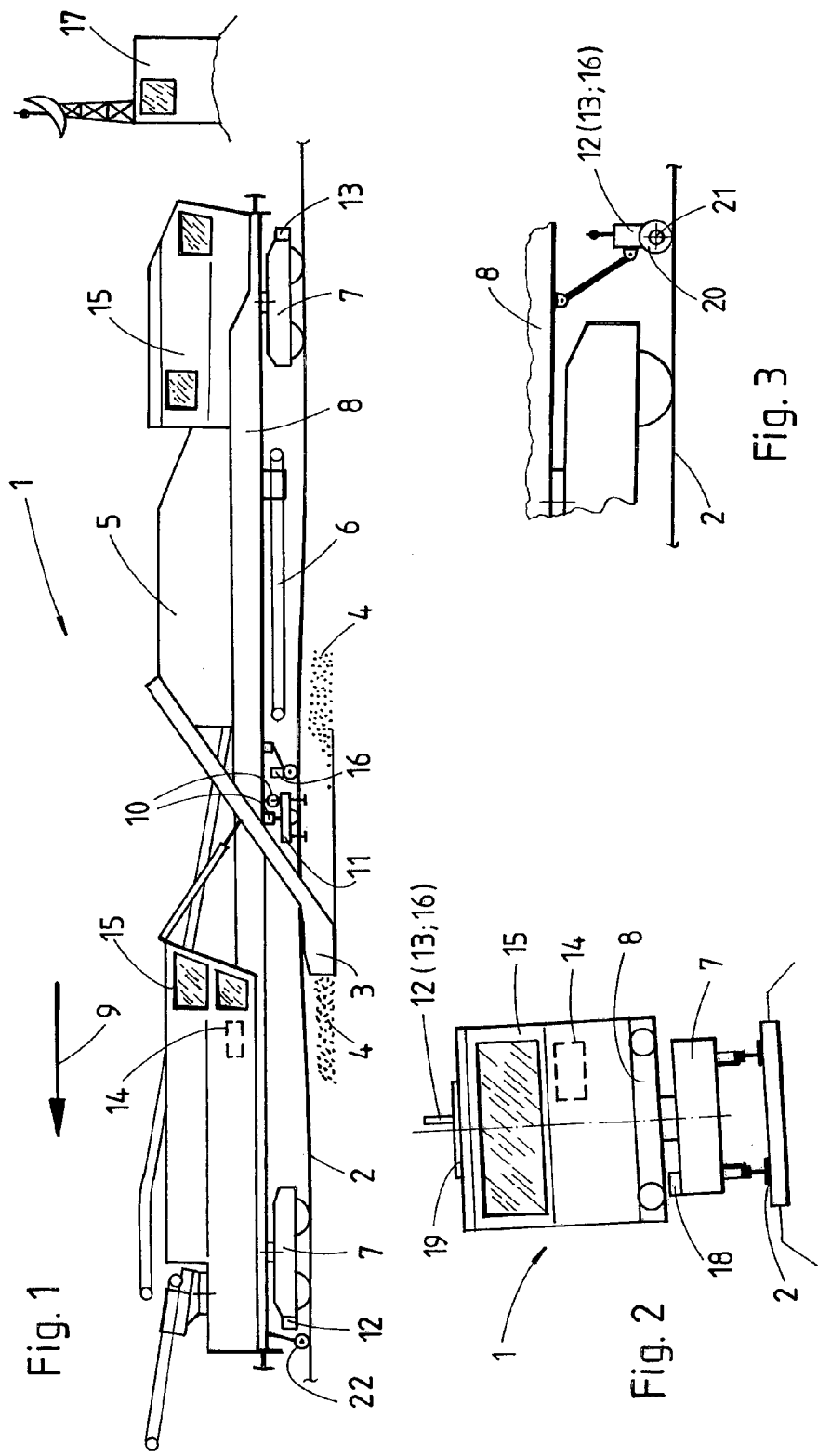

MACHINE FOR MAINTENANCE OF A TRACK

BACKGROUND OF THE INVENTION

Field of the Invention

The invention relates to a machine machine for maintenance of a track, having a machine frame that is mobile on the track, a pick-up device for picking up ballast located underneath the track, and a track lifting device vertically and transversely adjustable by means of drives.

With machines of this type, the existing track position is dissolved entirely as a result of the removal of the ballast bed. Therefore, it is advantageous to trace said position before it is destroyed and to make the position data available, with a time delay, for restoration of the new track position. Such machines are known, for example, from U.S. Pat. No. 4,432,284, GB 2 268 529, GB 2 268 021 and U.S. Pat. No. 7,181,851.

BRIEF SUMMARY OF THE INVENTION

It is the object of the present invention to provide a machine of the type mentioned at the beginning with which it is possible to optimise the precision and durability for the restoration of the original track position.

According to the invention, this object is achieved with a machine of the specified kind by means of the features as claimed.

With an embodiment of this kind, it is possible without problems to carry out a precise tracing and restoration of the track position with regard to both vertical and horizontal location, wherein the structural expense can be kept to a minimum. Consequently, the retooling of a machine at a later time can also be accomplished in a simple manner. In doing so, by including the global navigation satellite system, it is possible to also take into account the absolute track position. Since—in the scope of the subsequent track tamping for producing an exact finalised track position—only slight position corrections are required, the durability of the position of the freshly tamped track can be extended.

Additional advantages of the invention become apparent from the dependent claims and the drawing description.

BRIEF DESCRIPTION OF THE SEVERAL VIEWS OF THE DRAWINGS

The invention will be described in more detail below with reference to embodiments represented in the drawing in which FIG. 1 shows a simplified side view of a machine for cleaning ballast of a track, FIG. 2 shows a view of the machine in the longitudinal direction of the machine, and FIG. 3 shows a simplified representation of a tracing unit for tracing a track.

DESCRIPTION OF THE INVENTION

A machine 1, visible in FIG. 1, is equipped—for maintenance of a track 2—with a pick-up device 3 for picking up ballast 4 situated underneath the track 2. In the present case, said pick-up device 3 is designed as an endless clearing chain guided around the track. In principle, though, the pick-up device 3 can of course also be designed in a different shape, for example as a so-called undercutter or as a bucket wheel.

The ballast 4 picked up by the pick-up device 3 is delivered to a screening plant 5 for cleaning and thereafter is discharged upon the track 2 via a discharge conveyor belt 6. The machine 1 has a machine frame 8 supportable on on-track undercarriages 7 and is mobile continuously in a working direction 9 during working operations. Provided immediately to the rear of the pick-up device 3 is a track lifting device 11 for lifting the track 2, said device being connected to the machine frame 8 and vertically and transversely adjustable by means of drives 10.

Provided in front of the said pick-up device 3, with regard to the working direction 9, and connected to the front on-track undercarriage 7 is a first signal receiver 12—suitable for position detection in a global navigation satellite system—for tracing an existing track position.

A second signal receiver 13—suitable for position detection in a global navigation satellite system—for tracing a new track position created by placing the raised track 2 upon the reintroduced ballast 4 is connected to the rear on-track undercarriage 7. Associated with both signal receivers 12, 13 is a control device 14 designed for actuation of the drives 10 which shift the track lifting device 11 relative to the machine frame 8.

Alternatively, however, both signal receivers 12, 13 can also be arranged directly on the machine frame 8 or, as shown in FIG. 2, on a driver's cab 15. Likewise, in a further variant of the invention, a third signal receiver 16—suitable for position detection in a global navigation satellite system—for tracing the track position can be provided which is arranged immediately to the rear of the track lifting device 11.

A reference station 17 which has been surveyed in a terrestrial coordinate system is useful to significantly improve the precision of the position signals for the signal receivers.

For optimising the reception of the satellite signals, it is advantageous to arrange the signal receiver 12, 13, 16 on the driver's cab 15, as shown in FIG. 2. In this case, however, a compensation device 19 connected to a transverse inclination meter 18 must be provided for displacing the signal receiver relative to the driver's cab 15 in order to compensate for position changes caused by a transverse inclination of the track.

As shown in FIG. 3, a wheel axle 21 formed of two wheels 20 can also be articulatedly connected to the machine frame 8 for tracing the vertical and lateral position of the track 2. Fastened centrally on the wheel axle 21 is one of the signal receivers 12, 13 or 16. The latter may additionally also be equipped with an inertial measuring unit, as desired. Alternatively, however, instead of a satellite system, it would also be possible to provide each satellite receiver merely with an inertial measuring unit.

The method for working operations of the machine 1 will now be described in more detail. The first or front signal receiver 12 is guided along the vertical and lateral position of the track 2 by means of the connection to the on-track undercarriage 7. During this, with the aid of the satellite signals compensated by the reference station 17, the vertical and transverse position of the track 2 at a location x is registered at short time intervals as the existing track position. The corresponding data are intermediately stored in the control device 14 and, after reaching the location x, compared—with a time delay in dependence upon a distance measuring device 22—to the position data of the second signal receiver 13. Following this, the drives 10 of the track lifting device 11 are actuated until the position data of the second signal receiver 13 correspond to the stored data of the first signal receiver 12 and the track comes to lie in a desired track position.

By alternatively employing the third signal receiver 16, it is possible to take corrective action directly while laying the track 2 upon the discharged ballast 4 for exact positioning of the track in the desired position.

If, instead of a first and second signal receiver described in FIGS. 1 and 2, a first and second inertial measuring unit is used alternatively, the existing track position is recorded as a spatial curve corresponding to the track position. Said curve is reproduced in the region of the second inertial measuring unit for generating the desired track position.

The invention claimed is:

1. A machine for maintenance of a track, the machine comprising:
   a machine frame mobile on the track;
   a pick-up device for picking up ballast located underneath the track; and
   a track lifting device mounted for vertical and transverse adjustability by way of drives;
   a first signal receiver configured for position detection in a global navigation satellite system for tracing an existing track position, said first signal receiver being mounted on the machine in front of the said pick-up device with regard to a working direction;
   a second signal receiver mounted following, with regard to the working direction, and configured for position detection in the global navigation satellite system and connected to the machine for tracing a new track position created by placing a raised track onto a reintroduced ballast;
   a control device associated with said first and second signal receivers and configured for actuation of said drives for shifting said track lifting device relative to said machine frame.

2. The machine according to claim 1, which comprises a rear signal receiver for tracing the track disposed rearward of said track lifting device with regard to the working direction.

3. The machine according to claim 2, wherein said rear signal receiver is connected to said track lifting device.

4. The machine according to claim 1, which comprises a front on-track undercarriage and a rear on-track undercarriage, and wherein said first and second signal receivers are arranged on said front or rear on-track undercarriage, respectively.

5. The machine according to claim 1, wherein said first and second signal receivers are disposed on a front or rear end, respectively, of said machine frame, and wherein a compensation device connected to a transverse inclination meter is associated with each said signal receiver for a position correction with regard to an on-track undercarriage situated there under.

6. The machine according to claim 1, which comprises a reference station, installed at a fixed location adjacent to a track section to be surveyed, is associated with said first and second signal receivers, said reference station being known in a terrestrial coordinate system.

7. A machine for maintenance of a track, the machine comprising:
   a machine frame mobile on the track;
   a pick-up device for picking up ballast located underneath the track;
   a track lifting device vertically and transversely adjustable by way of drives;
   a first signal receiver configured as an inertial measuring unit for tracing an existing track position, said first signal receiver being connected to the machine in front of said pick-up device with regard to a working direction;
   a second signal receiver connected to said machine and configured as an inertial measuring unit for tracing a new track position created by placing a raised track upon a reintroduced ballast, said second signal receiver being is arranged following with regard to the working direction; and
   a control device associated with said first and second inertial measuring units and configured for actuation of said drives that shift said track lifting device relative to said machine frame.

8. The machine according to claim 7, which comprises a signal receiver suitable for position detection in a global navigation satellite system associated with at least one of said inertial measuring units.

\* \* \* \* \*